US010540548B2

(12) United States Patent
Ishiyama et al.

(10) Patent No.: US 10,540,548 B2
(45) Date of Patent: Jan. 21, 2020

(54) COMPARISON SYSTEM, COMPARISON APPARATUS, COMPARISON METHOD, AND PROGRAM

(71) Applicant: NEC CORPORATION, Tokyo (JP)

(72) Inventors: Rui Ishiyama, Tokyo (JP); Toru Takahashi, Tokyo (JP); Yuta Kudo, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 43 days.

(21) Appl. No.: 15/549,223

(22) PCT Filed: Feb. 25, 2016

(86) PCT No.: PCT/JP2016/055681
§ 371 (c)(1),
(2) Date: Aug. 7, 2017

(87) PCT Pub. No.: WO2016/136900
PCT Pub. Date: Sep. 1, 2016

(65) Prior Publication Data
US 2018/0039830 A1 Feb. 8, 2018

(30) Foreign Application Priority Data

Feb. 27, 2015 (JP) .................. 2015-038682

(51) Int. Cl.
G06K 9/00 (2006.01)
G06F 16/51 (2019.01)
(Continued)

(52) U.S. Cl.
CPC ......... *G06K 9/00577* (2013.01); *G06F 16/51* (2019.01); *G06F 17/18* (2013.01);
(Continued)

(58) Field of Classification Search
CPC ....... G06T 7/00; G06F 17/18; G06F 17/3028; G06Q 50/04; G06K 9/6267; G06K 2009/00583; G06K 9/00577
(Continued)

(56) References Cited

U.S. PATENT DOCUMENTS 6,630,996 B2 * 10/2003 Rao ..................... G01N 21/9501
356/237.1
7,783,104 B2 * 8/2010 Kawaragi ............. B81C 99/005
382/149

(Continued)

FOREIGN PATENT DOCUMENTS

JP 8-16870 A 1/1996
JP H0816870 A * 1/1996 ............... G06T 1/00
(Continued)

OTHER PUBLICATIONS

International Search Report for PCT/JP2016/055681, dated Apr. 19, 2016 (PCT/ISA/210).

*Primary Examiner* — Ishrat I Sherali
(74) *Attorney, Agent, or Firm* — Sughrue Mion, PLLC

(57) ABSTRACT

A comparison system includes a portable terminal including image capturing unit configured to capture a comparison image of a predetermined comparison region of a comparison object; and a server including comparison unit configured to compare the comparison object with a registered object on the basis of a statistical value for the luminance value of pixels in a registered image of the registered object, the pixels of the registered image existing at pixel positions corresponding to pixel positions estimated to be generating specular reflection in the comparison image captured by the portable terminal.

20 Claims, 10 Drawing Sheets

(51) Int. Cl.
*G06F 17/18* (2006.01)
*G06K 9/62* (2006.01)
*G06Q 50/04* (2012.01)

(52) U.S. Cl.
CPC . *G06K 9/6267* (2013.01); *G06K 2009/00583* (2013.01); *G06Q 50/04* (2013.01)

(58) Field of Classification Search
USPC .............................. 382/100, 141, 144, 147
See application file for complete search history.

(56) References Cited

U.S. PATENT DOCUMENTS

2007/0019856 A1* 1/2007 Furman .............. G01N 21/8806
382/141
2015/0154760 A1   6/2015 Ishiyama et al.

FOREIGN PATENT DOCUMENTS

| JP | 2002-174595 A | | 6/2002 | | |
| JP | 2010-267257 A | * | 11/2010 | ............... | G06T 7/60 |
| JP | 2011-50430 A | * | 3/2011 | ............... | G06T 1/00 |
| WO | 2013/191282 A1 | | 12/2013 | | |

* cited by examiner

REGISTERED IMAGE X OF COMPARISON
REGION OF REGISTERED OBJECT

CALCULATING HISTOGRAM OF LUMINANCE
OF ALL PIXELS OF REGISTERED IMAGE X

REGISTERING HISTOGRAM

REGISTERED IMAGE X

IMAGE Z OF PIXELS GENERATING SPECULAR REFLECTION IN COMPARISON IMAGE Y

EXTRACTING PIXELS AT POSITIONS CORRESPONDING TO PIXELS ESTIMATED TO BE GENERATING SPECULAR REFLECTION IN COMPARISON IMAGE Z FROM REGISTERED IMAGE X

- THE NUMBER OF EXTRACTED PIXELS M
- AVERAGE LUMINANCE u OF THE NUMBER OF PIXELS M
- CALCULATING STANDARD DEVIATION σ (e.g., 3.4)

SEQUENTIALLY ADDING ZONE OF LUMINANCE, RESPECTIVELY, BEFORE AND AFTER THE ZONE OF LUMINANCE μ FOR HISTOGRAM TO DETERMINE THE MINIMUM ZONE (BLACK REGION) WHERE THE SUM OF THE NUMBER OF PIXELS CONTAINED IN THE CONNECTED ZONES COMES BEYOND M (THE NUMBER OF EXTRACTED PIXELS)

CALCULATING STANDARD DEVIATION Σ FOR PIXELS IN THE ZONE (BLACK REGION)

COMPARISON SYSTEM, COMPARISON APPARATUS, COMPARISON METHOD, AND PROGRAM

CROSS REFERENCE TO RELATED APPLICATIONS

This application is a National Stage of International Application No. PCT/JP2016/055681 filed Feb. 25, 2016, claiming priority based on Japanese Patent Application No. 2015-038682, filed Feb. 27, 2015, the contents of all of which are incorporated herein by reference in their entirety.

TECHNICAL FIELD

The present invention relates to a comparison system, a comparison method, a comparison apparatus, and a program.

BACKGROUND ART

Recently, there is a growing need for comparison/identification of products for the purpose of quality control and distribution management.

Under the circumstances, an RFID performing data communication via a wireless communication system is incorporated into a product to comprehensively perform a commodity control and loss-prevention, antitheft, forgery prevention, etc. of commodities throughout all the stages of production, logistics, sales, etc. of products. For example, such a technology is proposed that an RFID chip is attached to an object and comparison is performed by using data stored in a memory in the RFID chip, thereby enabling logistics management, authenticity determination, etc. of the object.

It was, however, costly because an RFID chip was to be incorporated into every object. In a case where an object is small, it is often impossible to attach even a generally used tag to the object, and thus less possible to attach a special equipment such as an RFID chip.

Taking the foregoing into consideration, such a technology is proposed that comparison of an object (or individual identification) is performed by a pattern of a predetermined comparison region of an object to which the pattern is provided on the basis that the patterns applied to the individual objects somewhat differ from one another or that patterns include some common parts if the objects are the same kind of objects produced by using the same die, etc. (Patent Literature 1).

Also, as a technology for identifying a nature/type of a surface of an object by determining presence/absence of surface unevenness, such a technology is proposed in which an object is exposed to illumination light, calculation is performed to obtain a degree of change in a spatial direction for a feature amount of reflection light therefrom, and comparison is performed between thus calculated value and previously calculated dictionary data (Patent Literature 2).

CITATION LIST

Patent Literature

[Patent Literature 1]
WO2013/191282 A1
[Patent Literature 2]
JP 2002-174595A

SUMMARY OF INVENTION

Technical Problem

In order to perform constant comparison/identification of a pattern (object fingerprint) to be used in object identification or individual identification disregarding a difference of photographing condition, it was necessary to obtain an unevenness pattern (design (object fingerprint)) unique to an object in the form of an image of a luminance pattern (shade and shadow) including sufficiently separable high contrast against changes generated by a difference of photographing condition such as camera noise, lighting conditions, etc. Specifically, it was necessary to obtain both of a registered image as a reference image (master data) to be used in comparison and a comparison image of a comparison object to be captured at inspection. The registration is performed at a specific place where the products/parts are manufactured/delivered/controlled. Therefore, it is possible to prepare a dedicated imaging system capable of performing high-quality imaging. To the contrary, capturing of a comparison image needs to be performed at various places where to-be-compared products/parts are delivered, distributed, or used by users whose skills vary. Therefore, it was generally difficult at comparison to use the dedicated imaging system or a high-quality camera and long exposure which are used at registration, resulting in loosing convenience of comparison.

The Patent Literature 2 discloses a technology for identifying a nature/type of a surface of an object by determining presence/absence of surface unevenness, of which accuracy, however, is not enough to the extent of determining identicalness between a registered object and a comparison object by comparing minute unevenness patterns. Further, special equipment and a photographing condition are required in capturing a comparison image. More specifically, a comparison image needs to be captured under a photographing condition equivalent to a photographing condition when capturing a registered image as well as many images taken from different angles are required. This degrades convenience of comparison.

The present invention was made to solve the above described problem. An exemplary objection of the invention is to provide a comparison system, a comparison apparatus, a comparison method and a program capable of enhancing convenience of comparison performed between a registered image and a comparison image.

Solution to Problem

A comparison system according to an exemplary aspect of the invention includes a portable terminal including image capturing unit configured to capture a comparison image of a predetermined comparison region of a comparison object; and a server including comparison unit configured to compare the comparison object with a registered object on the basis of a statistical value for the luminance value of pixels in a registered image of the registered object, the pixels of the registered image existing at pixel positions corresponding to pixel positions estimated to be generating specular reflection in the comparison image captured by the portable terminal.

A comparison apparatus according to an exemplary aspect of the invention includes comparison unit configured to compare a comparison object with a registered object on the basis of a statistical value for the luminance value of pixels in a registered image of the registered object, the pixels of the registered image existing at pixel positions corresponding to pixel positions estimated to be generating specular reflection in a comparison image of a predetermined comparison region of the comparison object.

A comparison method according to an exemplary aspect of the invention includes comparing a comparison object with a registered object on the basis of a statistical value for the luminance value of pixels in a registered image of the registered object, the pixels of the registered image existing at pixel positions corresponding to pixel positions estimated to be generating specular reflection in a comparison image of a predetermined comparison region of the comparison object.

A program according to an exemplary aspect of the invention, causing a computer to execute comparison processing, causes a computer to execute comparison processing of comparing a comparison object with a registered object on the basis of a statistical value for the luminance value of pixels in a registered image of the registered object, the pixels of the registered image existing at pixel positions corresponding to pixel positions estimated to be generating specular reflection in a comparison image of a predetermined comparison region of the comparison object.

Advantageous Effect of Invention

According to the present invention, a registered image and a comparison image may be compared without losing the convenience.

DESCRIPTION OF EXEMPLARY EMBODIMENTS

Figure 1:
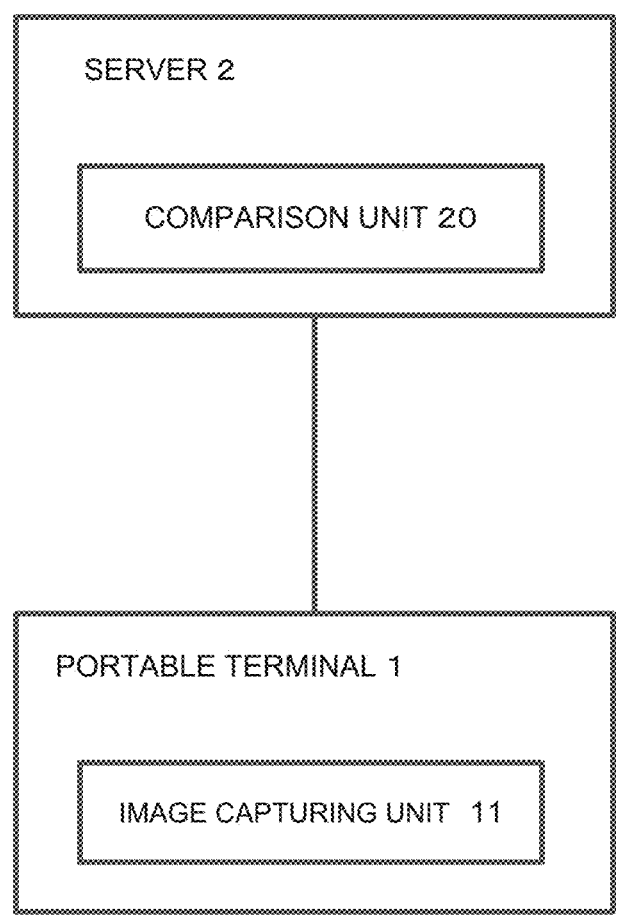
FIG. 1 is a block diagram illustrating a first exemplary embodiment.

To facilitate understanding of the present invention, background and summary of the present invention will be described below.

Hereinafter, description is made on a case where the identicalness between a registered object and a comparison object is determined by performing comparison between an image (hereinafter referred to as "registered image") of a comparison region of an object where minute unevenness (e.g., a textured pattern or a pattern of a material itself) is applied to the object as a comparison reference (e.g., a genuine product, etc. which is hereinafter referred to as "registered object") and an image (hereinafter referred to as "comparison image") of a comparison region of an object where minute unevenness (e.g., a textured pattern or a design of a material itself) is applied to the object to be compared (e.g., an object by which consumers, etc. of the object determine whether the object is a genuine product, etc. and which is hereinafter referred to as "comparison object").

In order to perform constant comparison/identification of an unevenness pattern (design (object fingerprint)) unique to an object and is used in identification of an object or an individual disregarding a difference of photographing condition, it was necessary to capture an image of luminance pattern (shade and shadow) including sufficiently high contrast capable of separating an unevenness pattern (design (object fingerprint)) unique to an object against a change generated by a difference of photographing condition such as camera noise, a lighting condition, etc. for both of a registered image as a reference image (master data) to be used in comparison and a comparison image of a comparison object captured at inspection. Registration is performed at a specific place where the products/parts are manufactured/delivered/controlled. Therefore, it is possible to prepare a dedicated imaging system. To the contrary, capturing of a comparison image needs to be performed at various places where to-be-compared products/parts are delivered, distributed, or used by different users whose skills vary. Therefore, it was generally difficult to use at comparison a dedicated imaging system or a high-quality camera and long exposure as those used at registration, resulting in loosing convenience of comparison.

In a case where a material itself, e.g., a plastic resin, of a to-be-compared object transmits light and in a case where an object has a surface where a reflectance ratio is high and thus can multiply generate interreflection, shadows are eliminated even from recessed portions. Therefore, a shade and shadow contrast reflecting unevenness unique to an object in an image is lowered. As a result, comparison accuracy degrades when comparing a previously-registered registered image with a comparison image captured at comparison. In some occasions, there was a case where an amount of image characteristics for identification could not be obtained because no shade and shadow was generated in a region originally set as a comparison region.

To solve the above problem, the present invention is directed to enhance convenience of comparison focusing at the following features.

Initially, in a case where a registered image and a comparison image are captured under the same photographing condition for the same object, a two dimensions distribution on an image of the same normal vector in reflection light in each minute region becomes identical between the registered image and the comparison image. Therefore, a comparison object of a comparison image including a two dimensions distribution of normal vector identical to a two dimensions distribution on an image of the normal vector in the minute region of the registered image is the same object as the registered object of the registered image.

By the way, even when image capturing is performed under any lighting conditions, under the condition that is equivalent to a condition that constant ambient light is applied to a certain portion of a to-be-image-captured object (when a light source is placed far enough for a to-be-image-captured object size), there is such a characteristic that the luminance value of pixels corresponding to the same normal vector on a surface of an object becomes the same value in the same image. For example, where there is a normal vector X, the luminance value of all pixels corresponding to the normal vector X in an image becomes A; and where there is a normal vector Y, the luminance value of all pixels corresponding to the normal vector Y in an image becomes B. Further, if image capturing is performed under different lighting conditions, the luminance values A, B of pixels corresponding to the same normal vector in an image captured under different conditions come to be different values; however, because a lighting condition applied to a surface region of a to-be-image-captured object and corresponding to each pixel is the same within the same image, the luminance values of pixels corresponding to the same normal vector within the same image become the same values. More specifically, in a case where the luminance value of all pixels corresponding to a normal vector X in an image of an object captured under a lighting condition 1 is A, the luminance value of all pixels corresponding to the normal vector X in an image of the same object captured under a lighting condition 2 does not always become A but becomes C for all pixels. Similarly, pixels of a normal vector Y have a luminance value B under the lighting condition 1 and do not always have the luminance value B under the lighting condition 2 but has a luminance value D for all pixels.

In view of the above, even in a case where a registered image and a comparison image are captured under different lighting conditions, in so far as the luminance value of a group of pixels in a registered image and corresponding to a two dimensions distribution of the same normal vector on an image in a comparison image is the same or falls under a variance of a certain range affected by noise, the registered image coincides with the comparison image. More specifically, in a case where the luminance value of a group of pixels (pixels of a normal vector X) in a registered image and corresponding to a two dimensions distribution of a normal vector X in a comparison image becomes E or falls under a range close to E for all pixels, the registered image and the comparison image can be determined to be identical or closely similar to each other.

It is, however, difficult to calculate a normal vector of each minute region by a typical terminal capable of being used at various places by different users for performing comparison. The typical terminal is exemplified by a camera built in a smartphone, etc.

In exemplary aspect of the present invention, instead of a two dimensions distribution of a normal vector, a two dimensions distribution of a normal vector in a specific direction will be obtained. More specifically, positions of pixels on a comparison image and generating specular reflection are obtained from a comparison image, and a two dimensions distribution of the pixels on the comparison image and generating specular reflection is considered as a two dimensions distribution of the predetermined same normal vector. Specifically, in a case where a strong light source exists in a specific direction, because only pixels including a normal vector of which relative direction with a camera/light source is the specific direction generate strong specular reflection, a two dimensions distribution of the normal vector in a specific direction can be extracted.

Then, the luminance value of pixels in the registered image of the registered object, the pixels of the registered image existing at pixel positions corresponding to positions of pixels generating specular reflection in the comparison image on the comparison image, is obtained to calculate a statistical value for the luminance value. The statistical value represents, for example, a degree of distribution of the luminance value of pixels. For example, the statistical value represents standard deviation, variance, etc. of the luminance value.

In a case where thus calculated statistical value falls under a predetermined range, it is determined that a registered image and a comparison image coincide with or are closely similar to each other. As a result, a registered object and a comparison object are determined to be identical or closely similar to each other.

First Exemplary Embodiment

A first exemplary embodiment of the present invention will be described below.

FIG. 1 is a block diagram illustrating the first exemplary embodiment of the present invention.

FIG. 1 is a block diagram of a comparison system in the first exemplary embodiment.

The comparison system of the first exemplary embodiment comprises a portable terminal 1 including an image capturing unit 11 configured to capture a comparison image of a predetermined comparison region of a comparison object and a server 2 including a comparison unit 20 configured to compare the comparison object with a registered object on the basis of a statistical value for the luminance value of pixels in a registered image of the registered object, the pixels of the registered image existing at pixel positions corresponding to pixel positions estimated to be generating specular reflection in the comparison image captured by the portable terminal 1.

Figure 2:
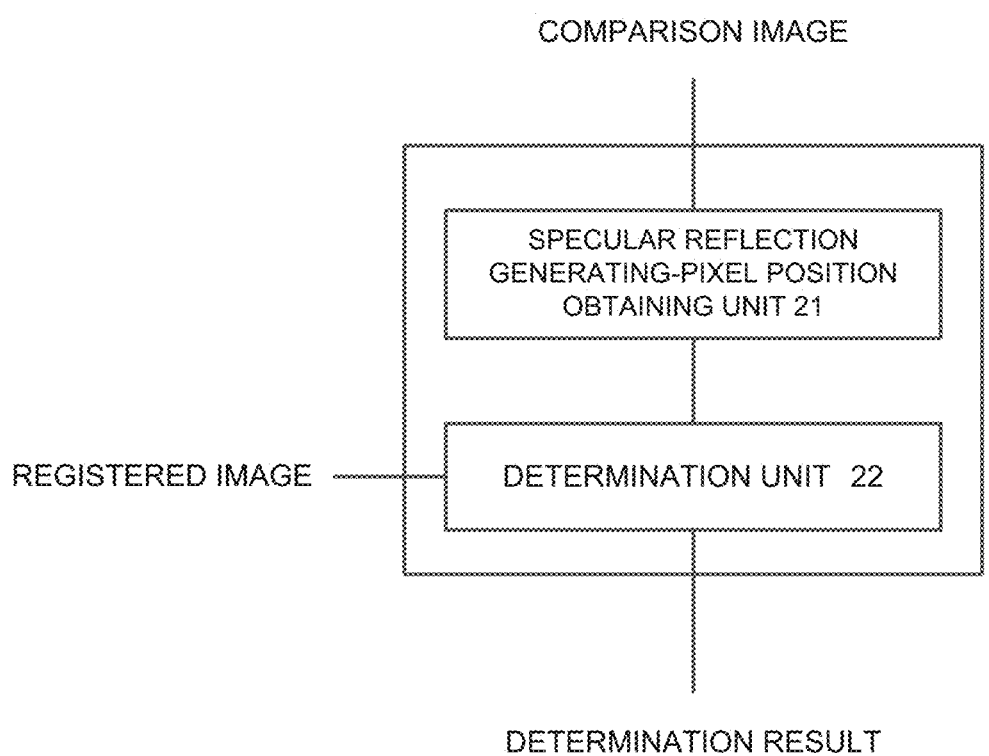
FIG. 2 is a block diagram illustrating a comparison unit 20.

The comparison unit 20 includes, as illustrated in FIG. 2, a specular reflection generating-pixel position obtaining unit 21 configured to obtain positions of pixels on a comparison image and generating specular reflection from the comparison image of a predetermined comparison region of a comparison object provided with an unevenness design (pattern) and a determination unit 22 configured to obtain the luminance value of pixels in a registered image of the registered object, the pixels of a registered image existing at pixel positions corresponding to thus obtained positions of pixels, calculate a statistical value for thus obtained luminance value, and determine identicalness between the comparison object and a registered object.

Here, the object means a product produced by a manufacturer. Examples of such product includes products available to general consumers in the form of a finished product such as televisions, personal computers, smartphones, and bags, and parts to be used in a finished product such as fastening parts (slide fasteners, hook and loop fasteners, snap fasteners, rail fasteners, buckles, code stoppers, belt adjusters, swivels, snap buttons, buttons, etc.), screws, nails, gears, bearings, pipes, valves, shafts, semiconductor chips, and commodity tags and parts made of plastic, ceramics, etc.

The design or pattern means an uneven random pattern applied to an object. Such design or pattern is provided by satin processing, emboss processing, etc. The design or pattern also includes, for example, a case where a pattern is formed on a comparison region on purpose for the sake of identification or comparison of an object, in addition to a case where a pattern is formed as a design. Further, a concept of pattern includes a wrinkle (embossed) pattern, etc. obtained from surface processing (e.g., emboss processing) to leather products, in addition to a textured pattern processed to metal or synthetic resin (plastic, etc.), a sand-blasted surface or a casted surface. Still further, a concept of pattern includes coating that generates random unevenness on a surface. The coating includes surfaces coated by coating materials including different viscosities and a coating material mixed with solid particles, and by so-called hammer net coating or hammer tone coating. Further, the coating includes a case where a coated surface is provided with a textured pattern via sandblast processing. The design or pattern may be an uneven random pattern naturally uniquely formed in the process of producing an object.

An object may be made of any material. In a case where an object is made of a material that transmits light by itself such as a plastic resin or in a case where an object has a surface where a reflectance ratio is high and thus can multiply generate interreflection, shadows are eliminated even at recessed portions. Therefore, a shade and shadow contrast in an image reflecting unevenness unique to an object is lowered. For this reason, it is hard for the conventional method to perform comparison processing. In this point of view, the present invention is effective.

Now, a description of a comparison region is made below. The comparison region is not limited to any region in so far as the region is provided with a pattern; however, when taking easiness of comparison processing into consideration, it is desirable to preliminary decide a comparison region. A comparison region may be set to a region at a position which is defined referring to commonly existing reference portions among objects. For example, the reference portion of an object is a trademark, a logo, a manufacturer's name, a manufacturing company, a brand name, a product name, a product number, a specific figure or contour line, etc. of a product that is attached, printed, marked, or branded to an object. A common pattern is seen in every reference portion among the same kind of objects disregarding the individuals and has featured visions in appearance. The typical reference portion is processed to have a good visibility regardless of a lighting condition. Then, the positional orientation of the reference portions is set as a reference and feature thereof is stored, so that a comparison region of an object can be automatically detected. A technology to amend a position/orientation of a captured image by using an image characteristic, i.e., featured vision in appearance, is an ordinary work. Thus, various kinds of technologies including template matching are available.

Alternatively, it is also possible to prepare a member (adaptor) capable of being fit to an object on its side where a pattern is provided and provide on a part of the member a hollow wall (hole) that enables viewing (image capturing) a pattern from the outside, thereby allowing the viewable (image capturing capturable) region to be set as a comparison region. With such configuration, it is not necessary to identify a positional orientation of a comparison region at every identification but can securely specify a comparison region.

Now, a description will be made on a registered image and a comparison image to be input into the comparison system.

Initially, an image of a design within a comparison region of a registered object (genuine product, etc.) has been registered as a registered image before performing comparison processing. In capturing a registered image, it is desirable that an image including a high contrast of shade and shadow and less affected by transmitted light, interreflection, or noise has been obtained by using a high-quality camera, long exposure, etc. Generally, capturing of a registered image is often limitedly performed at specific facilities or places and thus the convenience will not be lost by such limitation. It is also effective for improvement of authentication performance to obtain a plurality of registration images under different lighting conditions by securely placing an object and a camera and capturing a plurality of images while switching light sources.

A comparison image may be captured under a lighting condition different from a lighting condition when capturing a registered image. Because comparison needs to be performed at various places by different users, it is generally hard to use at comparison a high-quality camera and long exposure that is used at registration. This loses convenience of the system. To solve the problem, capturing of a comparison image is performed via a typical method by using the image capturing unit 11 (smartphone camera, etc.) of the portable terminal 1. In addition, it is preferable for the present invention that a LED built in the portable terminal 1 (smartphone, etc.) is lighted up/out, thereby creating a state that a light source exists in a specific direction and limiting generation of specular reflection in pixels including a normal vector in the specific direction. Image capturing with flush by using a commercial camera is equivalent thereto. Another method can be employed when there is a light source from a specific direction in the environment or when an external light source is used.

Now, an operation of each unit of the comparison unit 20 will be described below.

The specular reflection generating-pixel position obtaining unit 21 obtains positions of pixels generating specular reflection from a comparison image of a comparison range to be compared. Depending on a photographing condition, a contrast of shade and shadow in an image tends to be lowered because of transmitted light, interreflection, or noise. The specular reflection, however, can be easily extracted because it has a strong contrast. If image capturing is performed with flush, etc., the aforementioned state becomes more remarkable. Examples of a method of obtaining pixels generating specular reflection can include a method in which pixels generating specular reflection are selected on the basis of a difference between an image applied with light from a light source such as flush and an image not applied with light and the positions of the pixels are obtained, a method in which pixels saturated with luminance in a comparison image are detected and positions of the pixels are obtained, a color component (white and colors of an object) detection, and a local luminance peak detection. By using any one of the aforementioned methods, positions of pixels in a comparison image and estimated to be generating specular reflection are obtained.

The determination unit 22 obtains the luminance value of pixels in a registered image of the registered object, the pixels of a registered image existing at pixel positions corresponding to positions of pixels in a comparison image obtained by the specular reflection generating-pixel position obtaining unit 21, and calculates a statistical value of thus obtained luminance value. The statistical value represents, for example, a degree of distribution of the luminance value of pixels. In other words, the statistical value represents a standard deviation, variance, etc. of the luminance value. In a case where a plurality of registered images captured under different lighting conditions can be used for one registered object, a statistical value can be calculated for each image to obtain a plurality of statistical values. Then, in a case where thus calculated statistical values fall under a predetermined range, it is determined that a registered image and a comparison image coincide with or are closely similar to each other. As a result, it is determined that a registered object and a comparison object are identical or closely similar to each other and thus have mutual identicalness between them. On the other hand, in a case where thus calculated statistical values do not fall under a predetermined range, a registered image does not coincide with a comparison image. In this case, it can be determined that a comparison object (comparison product) is not a registered object (genuine product). Incidentally, a threshold to be compared with statistical values may be previously set to be, for example, a predetermined value or may be set on the basis of a registered image at each comparison. Calculation of a threshold may be performed on the basis of, for example, a two-dimensional distribution including the luminance value of pixels estimated to be generating specular reflection in a registered image and the number of pixels estimated to be generating specular reflection in a registered image.

Figure 3:
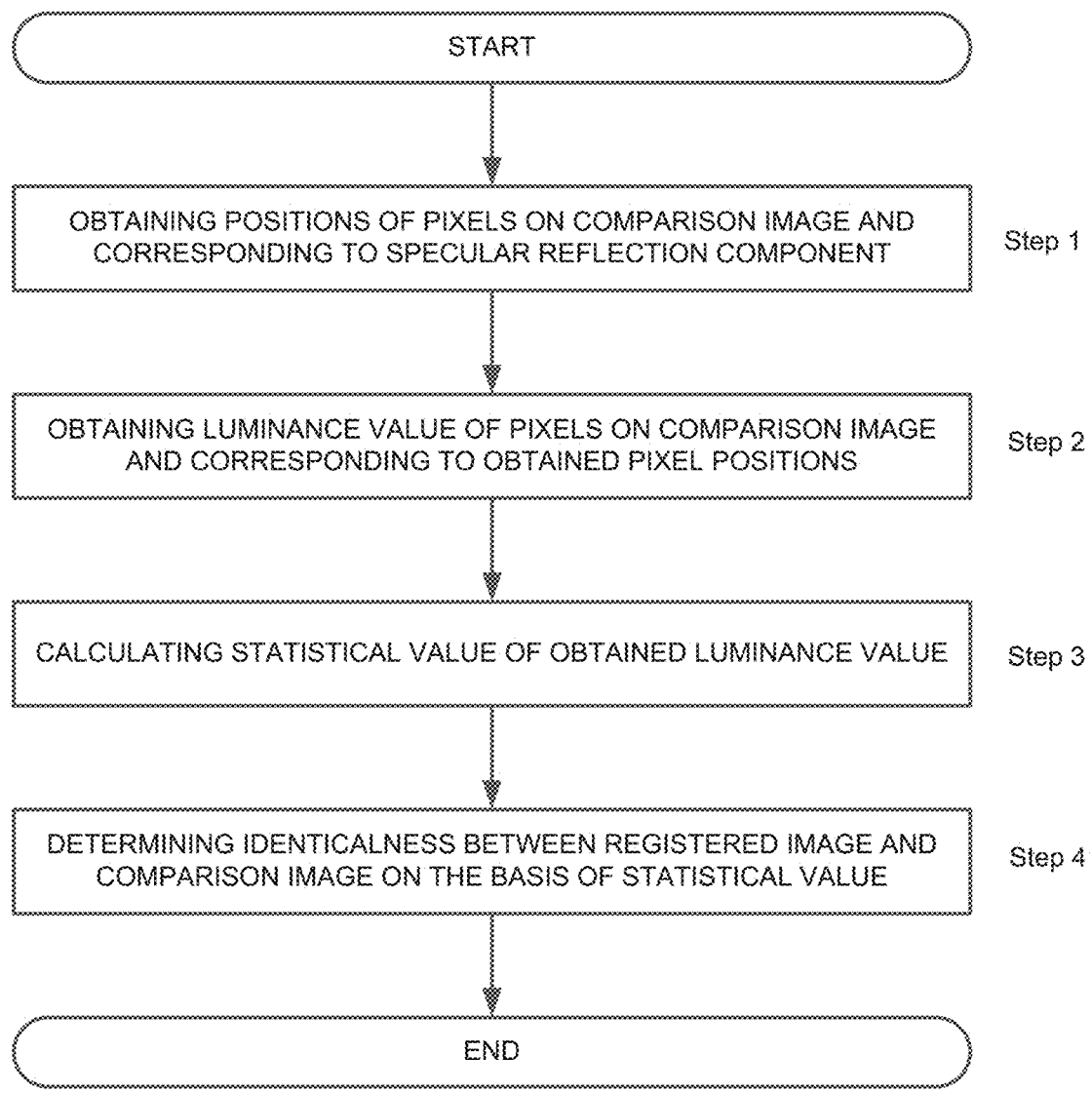
FIG. 3 is a flow chart of the first exemplary embodiment.

Now, an operation of the comparison system in the first exemplary embodiment will be described below with reference to a flow chart of FIG. 3.

Initially, a comparison image in a comparison range of a comparison object is input into a specular reflection-pixel position obtaining unit 21. The specular reflection-pixel position obtaining unit 21 obtains positions of pixels generating specular reflection from a comparison image of a to-be-compared comparison range and obtains positions of the pixels on the comparison image (Step 1).

Subsequently, the determination unit 2 obtains the luminance value of pixels in a registered image of the registered object, the pixels of a registered image existing at pixel positions corresponding to the pixel positions obtained by the specular reflection generating-pixel position obtaining unit 21 (Step 2). Then, the determination unit 2 calculates a statistical value of thus obtained luminance value (Step 3).

Finally, the determination unit 2 determines identicalness between the registered image and the comparison image on the basis of thus calculated statistical value of the luminance value (Step 4).

Figure 4:
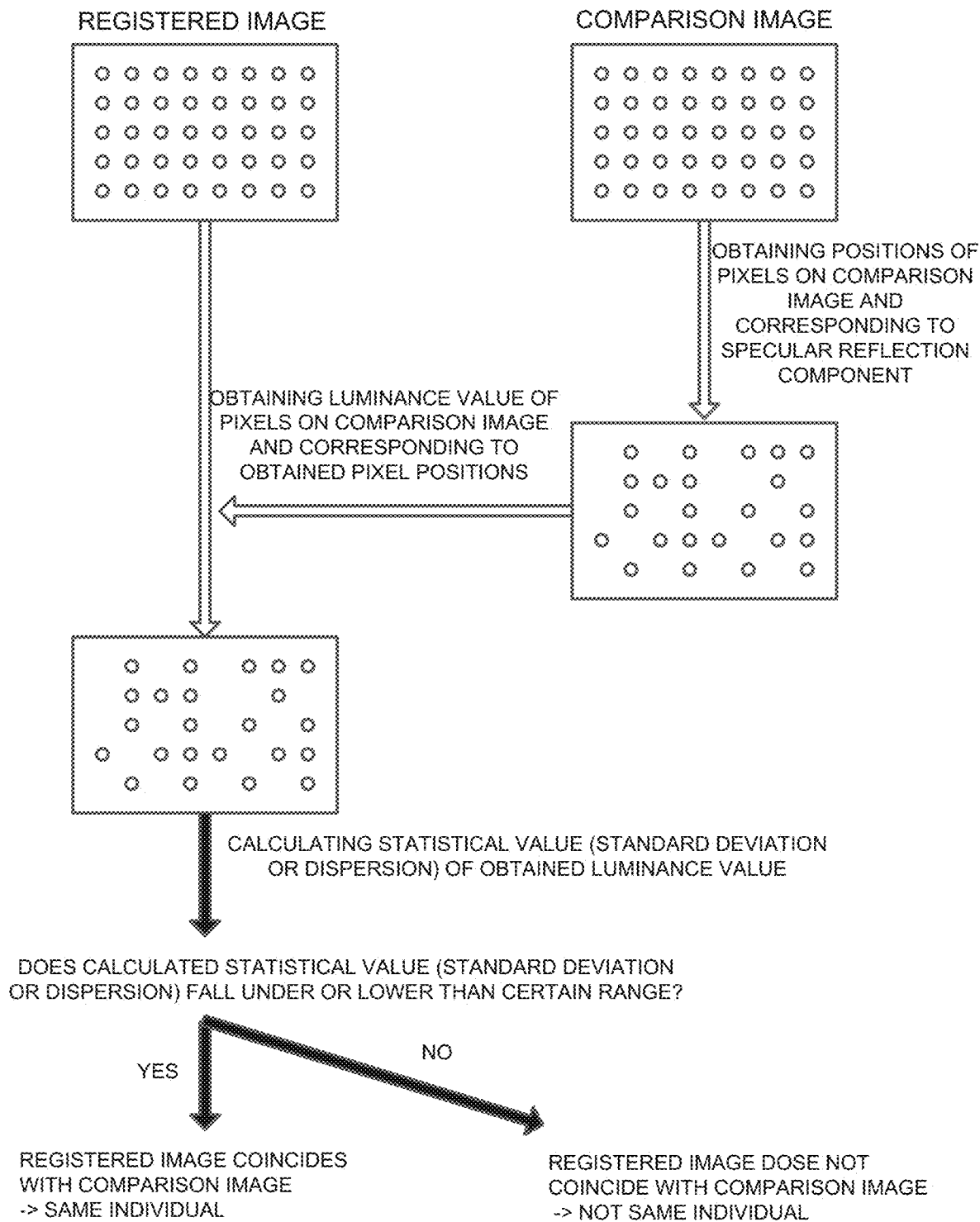
FIG. 4 explanatively illustrates procedure of the first exemplary embodiment.

A comparison operation of the comparison system in the first exemplary embodiment will be described below in detail with reference to FIG. 4.

Initially, a comparison image in a comparison range of a comparison object is input into the specular reflection-pixel position obtaining unit 21. The specular reflection-pixel position obtaining unit 21 obtains positions of pixels generating specular reflection from the comparison image of a to-be-compared comparison range and obtains positions of the pixels on the comparison image.

Then, the determination unit 22 obtains the luminance value of pixels in a registered image of the registered object, the pixels of the registered image existing at pixel positions corresponding to pixel positions obtained by the specular reflection generating-pixel position obtaining unit 21 and calculates a statistical value of thus obtained luminance value.

The determination unit 22 determines whether thus calculated statistical value of the luminance value falls under a range of a predetermined threshold or is lower than the predetermined threshold. When the statistical value falls under a range of the predetermined threshold or is lower than the predetermined threshold, it can be determined that a registered image coincides with or is closely similar to a comparison image. As a result, it can be determined that a registered object (genuine product) and a comparison object (comparison product) have mutual identicalness between them. To the contrary, in a case where thus calculated statistical value (variance or standard deviation) falls under a predetermined range or is not lower than the predetermined threshold, a registered image does not coincide with a comparison image and, in this case, it can be determined that a comparison object (comparison product) is not a registered object (genuine product or registered specific individual). In a case where a plurality of registered images can be used, the determination can be made for a plurality of times for each image. A case where coincidence determination is made in all of or more than a predetermined degree of the number of registered images, the determination is made final. This enables enhancement of determination accuracy.

The comparison system of the first exemplary embodiment can compare a registered image with a comparison image even when the comparison image is not captured under a lighting condition identical to a lighting condition when capturing the registered image. Further, the comparison system can capture a comparison image with a typical image capturing means without requiring special equipment/long exposure, etc. and thus can be used anywhere.

The comparison system of the first exemplary embodiment utilizes not shade and shadow of a diffuse reflection component but a specular reflection component. Therefore, even in a case where a material itself, e.g., a plastic resin, of an object transmits light or an object has a surface of which reflection ratio is high and thus can multiply generate interreflection (diffused light), it is possible to compare a registered image with a comparison image without being affected thereby.

Second Exemplary Embodiment

Figure 5:
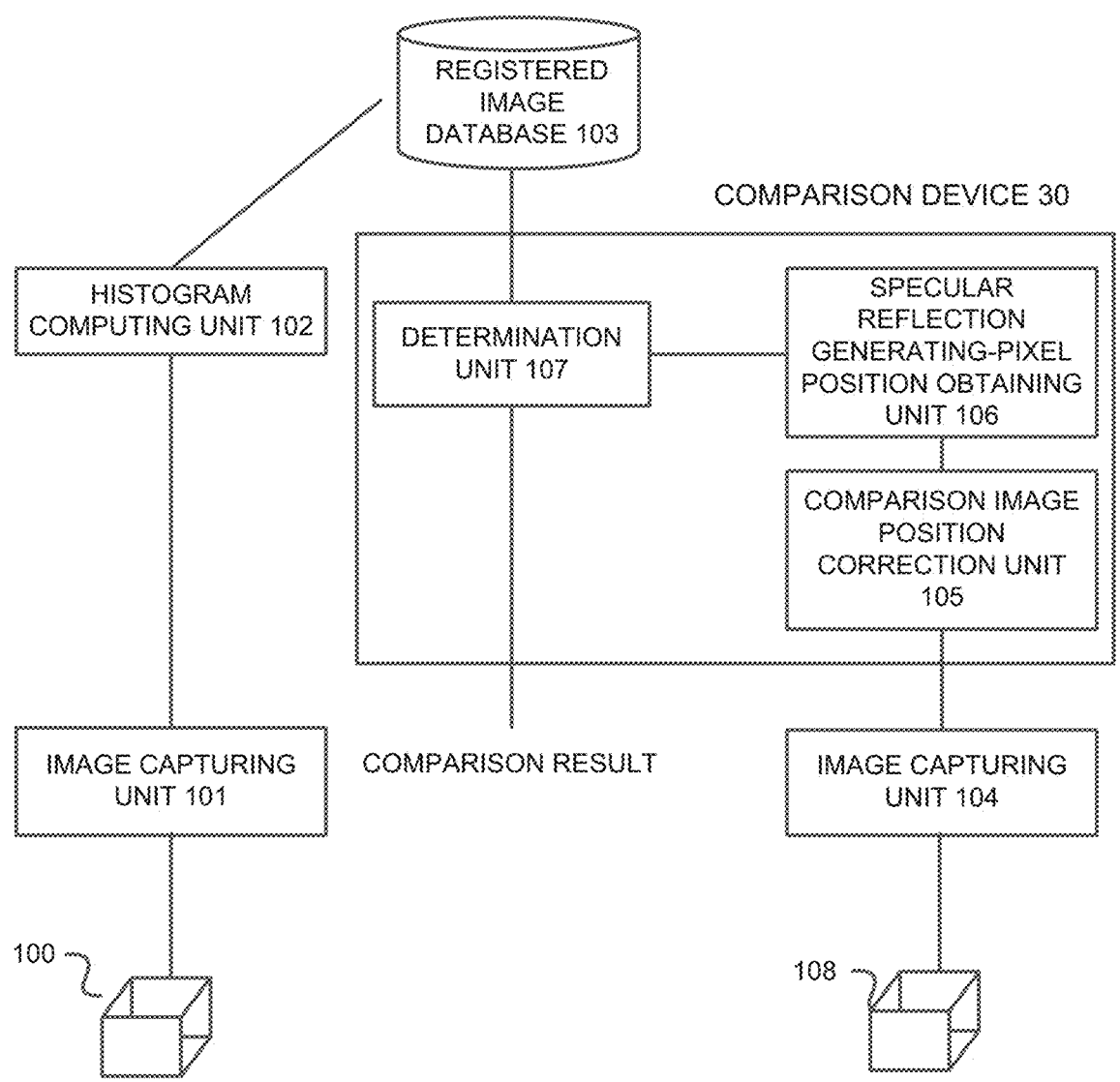
FIG. 5 is a block diagram illustrating a second exemplary embodiment.

A second exemplary embodiment will be described below. FIG. 5 is a block diagram illustrating a comparison system in the second exemplary embodiment.

The comparison system in the second exemplary embodiment includes an image capturing unit 101, a histogram computing unit 102, a registered image database 103, an image capturing unit 104, a comparison image position correction unit 105, a specular reflection generating-pixel position obtaining unit 106, and a determination unit 107. Incidentally, the comparison image position correction unit 105, the specular reflection generating-pixel position obtaining unit 106, and the determination unit 107 compose a comparison apparatus 30.

The image capturing unit 101 is placed on a side of producing an object 100 (e.g., producer, etc. of the object 100) or on a side of performing a quality control of object 100 in order to allow a producer, etc. to capture a registered image of a comparison region of the object 100. Capturing of a registered image X by the image capturing unit 101 is performed with long exposure or by HDR, etc. in such a way that an image including a high contrast of shade and shadow is obtained without being affected by transmitted light, interreflection, or noise. It is desirable to capture an image of a comparison region in such a way that a position of the comparison region is accurately captured as a reference portion with reference to a logo, etc. of an object. Any file format can be used for the captured image. JPEG, etc. is acceptable. Incidentally, in the exemplary embodiment, a registered image of 100×100 pixels was captured.

Figure 6:
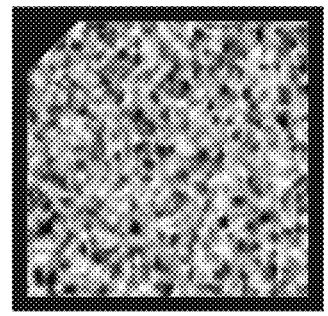
FIG. 6 explanatively illustrates procedure of the second exemplary embodiment.
Figure 6:
Figure 6:
Figure 6:
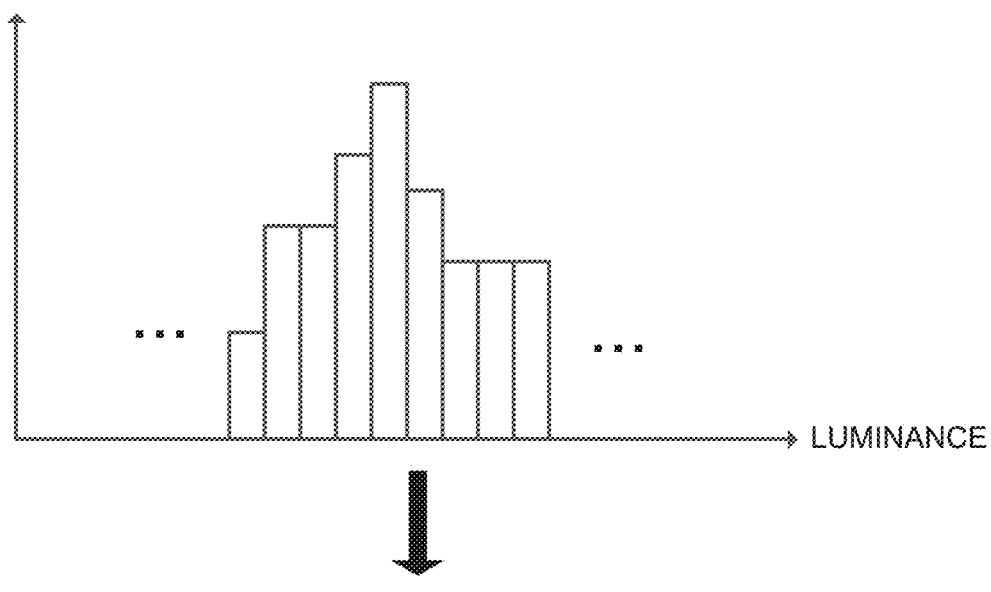
Figure 6:
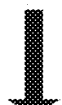

The histogram computing unit 102 computes a histogram to be registered in the registered image database 103 from thus captured registered image X. FIG. 6 illustrates computation of a histogram. The histogram computing unit 102 computes a histogram including the luminance value of pixels and the number of pixels including the luminance value thereof for all pixels (10000 pixels in the exemplary embodiment) of the registered image X. The computed histogram and the registered image X are associated with each other to be registered in the registered image database 103.

The registered image database 103 is a database in which a registered image and a histogram are associated with each other to be stored. Incidentally, production information such as a place in which the product was manufactured, a kind, and a production date and distribution information such as a destination and delivery date, etc. may be associated with the registered image to be stored. With the configuration, history information of a compared object can also be obtained.

The image capturing unit 104 is placed on a side of a testing department of object 108, a destination of object 108, or a purchaser who purchased object 108. That is, the image capturing unit 104 is placed on a side requiring comparison of object 108. The image capturing unit 104, different from the image capturing unit 101, is not necessarily be an imaging system which requires a special condition. The image capturing unit 104 may be, for example, a camera, etc. of a smartphone. The image capturing unit 104 captures a comparison image referring to a portion (e.g., a logo) that preliminary set as a reference. The captured comparison image is sent to the comparison image position correction unit 105.

Figure 7:
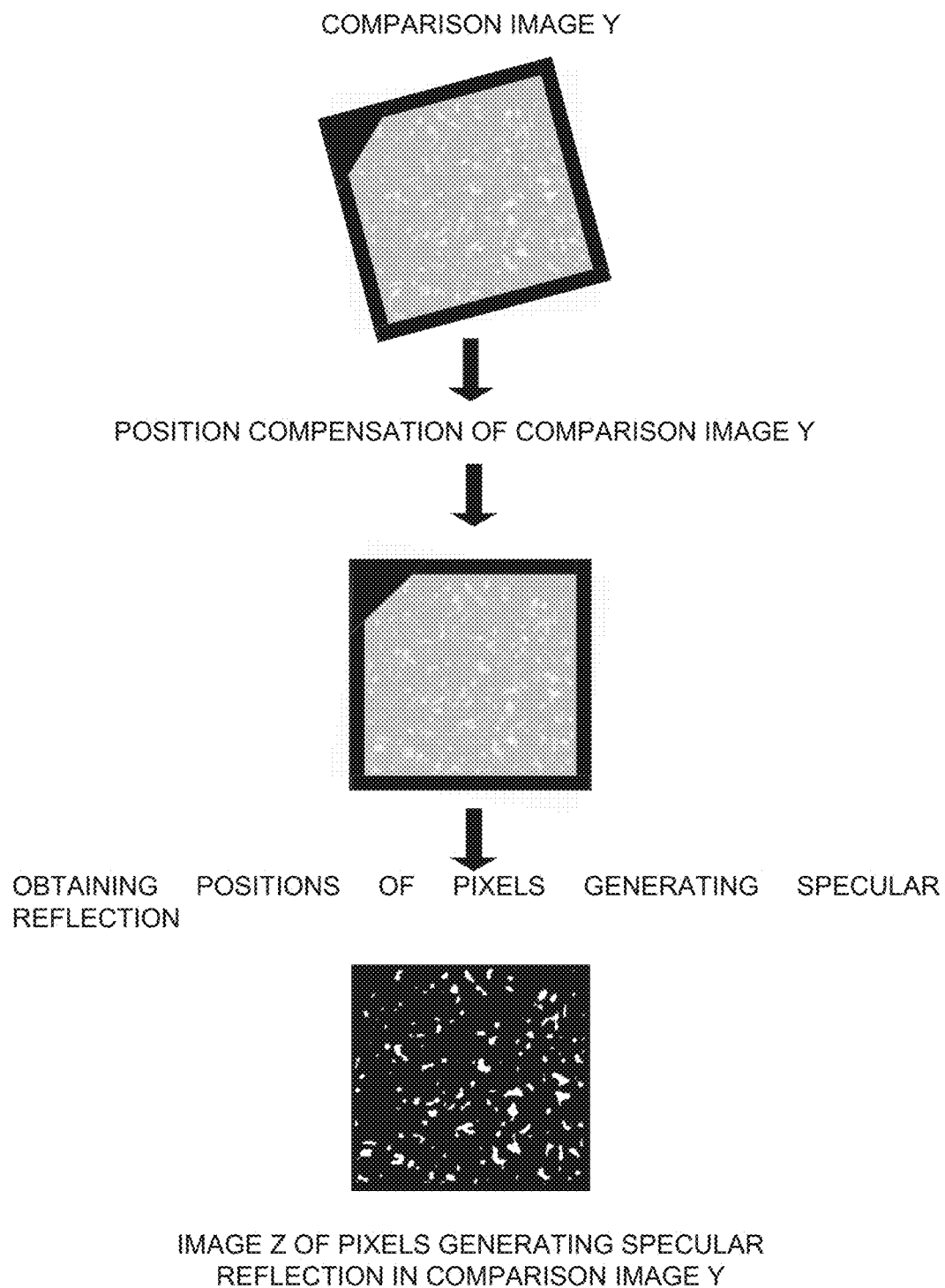
FIG. 7 explanatively illustrates another procedure of the second exemplary embodiment.

The comparison image position correction unit 105 performs position correction of the comparison image received from the image capturing unit 104. The position correction is performed for the purpose of correction of positions of a registered image and a comparison image to learn correct positions of pixels thereof. The position correction is performed, as illustrated in FIG. 7, to detect a portion to be set as a reference such as a logo and correct a comparison image in such a way that the comparison image comes to be oriented and positioned matching with the registered image.

The specular reflection generating-pixel position obtaining unit 106 obtains positions of pixels generating specular reflection from the comparison image of which position has been corrected. Depending on the photographing condition, the image tends to have low contrast of shade and shadow due to transmitted light, interreflection, or noise; however, the positions of pixels can be extracted with ease owing to the strong contrast of specular reflection. A method in which pixels saturated with luminance in a comparison image are detected to obtain positions of the pixels, a color component (white and colors of an object) detection, and a local luminance peak detection can be used. Also, it is possible to use a method in which pixels in the comparison image are divided into specific blocks (e.g., 5×5), the average luminance and standard deviation of the blocks are obtained, and pixels including high luminance that is more than several folds (e.g., twice) higher in standard deviation than average are extracted as specular reflection. By using the aforementioned methods, positions of pixels in the comparison image and estimated to be generating specular reflection are obtained.

Figure 8:
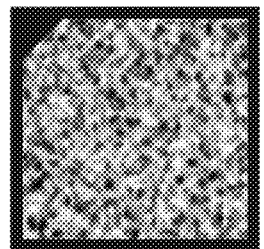
FIG. 8 explanatively illustrates further another procedure of the second exemplary embodiment.
Figure 8:
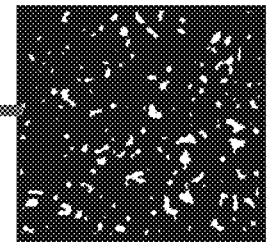
Figure 8:
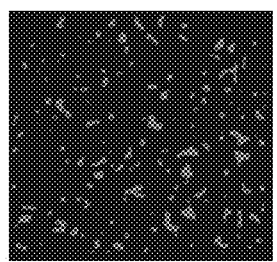

The determination unit 107 obtains, as illustrated in FIG. 8, the number of pixels M (e.g., M=678) of pixels in a comparison image Z obtained by the specular reflection generating-pixel position obtaining unit 106 and the luminance value of pixels in a registered image X and corresponding to the positions of the M number pixels in the comparison image Z. Then, the determination unit 107 computes an average value u of the luminance value of the M number pixels and standard deviation a (e.g., 3.4).

Figure 9:
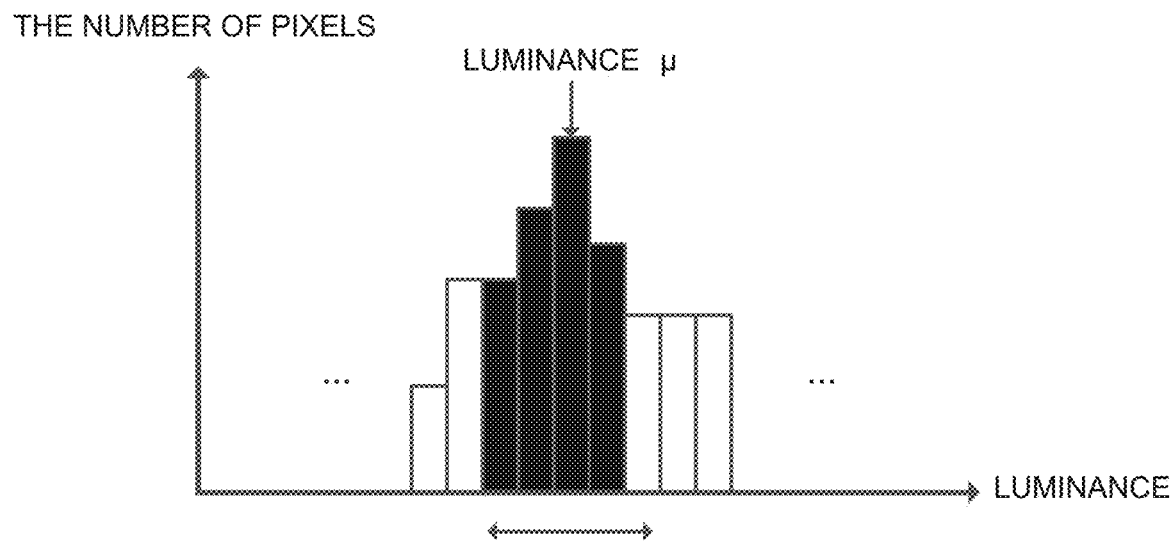
FIG. 9 explanatively illustrates still another procedure of the second exemplary embodiment.
Figure 9:
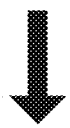

Then, the determination unit 107 reads out a histogram of a registered image corresponding to a to-be-compared comparison image from the registered image database 103 and, as illustrated in FIG. 9, sequentially adds a section of luminance, respectively, before and after a section of luminance μ for the histogram to determine the minimum section (black region) where the sum of the number of pixels contained in the connected sections comes beyond M (in the exemplary embodiment, 678 pixels). Then, the determination unit 107 calculates standard deviation Σ for the pixels in the section (black region).

Finally, the determination unit 107 performs comparison between a standard deviation σ calculated on the basis of a comparison image and the standard deviation Σ calculated on the basis of a registered image and, if standard deviation σ<standard deviation Σ×α is satisfied, it is determined that the comparison image coincides with the registered image. Incidentally, α is a constant that decides severeness of determination and is set in advance (e.g., 1.5). In a case where the comparison image coincides with the registered image, the determination unit 107 makes a determination that a registered object and a comparison object are identical or closely similar to each other, i.e., have mutual identicalness between them. In a case where a plurality of registered images can be used, the determination can be made for a plurality of times for each image. In other words, the determination unit 107 computes the above described standard deviation Σi for a registered image i and makes a coincidence determination based on whether σ<Σi×α is satisfied. In a case where coincidence determination is made in all or more than a certain degree of the number of registered images, the coincidence determination is made final. This can improve determination accuracy more.

Incidentally, in a case where there is a plurality of registered objects and comparison is performed with each of the registered objects j, if σ<Σj×α is established for a plurality of objects to result in the coincidence determination and, if a determination that a value of Σj coincides with the smallest object j is made, the most similar registered object can be searched. In a case where a plurality of registered images k can be used for each registered object j, such a determination can be made that a comparison object coincides with the object j including a value corresponding to the minimum value of Σj, k.

Incidentally, the image capturing unit and the histogram computing unit, the registered image database and the comparison image position correction unit, the specular reflection generating-pixel position obtaining unit, and the determination unit may be formed independently from each other and may be connected via a network with each other. Alternatively, some of the units may be combined.

According to the exemplary embodiment, as described above, comparison can be performed between a registered image and a comparison image even when the comparison image is captured under a lighting condition different from a lighting condition when capturing the registered image. Further, the comparison system can capture a comparison image by using typical image capturing means without requiring special equipment/long exposure, etc. and thus can be used anywhere.

With the configuration including the comparison image position correction unit, special positioning is no longer required when capturing a comparison image.

Because the comparison system utilizes a specular reflection component, even in a case where a material itself, e.g., a plastic resin, of an object transmits light or an object has a surface where a reflection ratio is high and thus interreflection (diffused light) can be multiply generated, it is possible to compare a registered image with a comparison image without being affected thereby.

As obvious from the above description, it is possible to configure each unit by hardware or realize a function of each unit by a computer program. In this case, a processor run on a program stored in a program memory enables to realize functions and execute operations similar to those of the above described exemplary embodiment.

Figure 10:
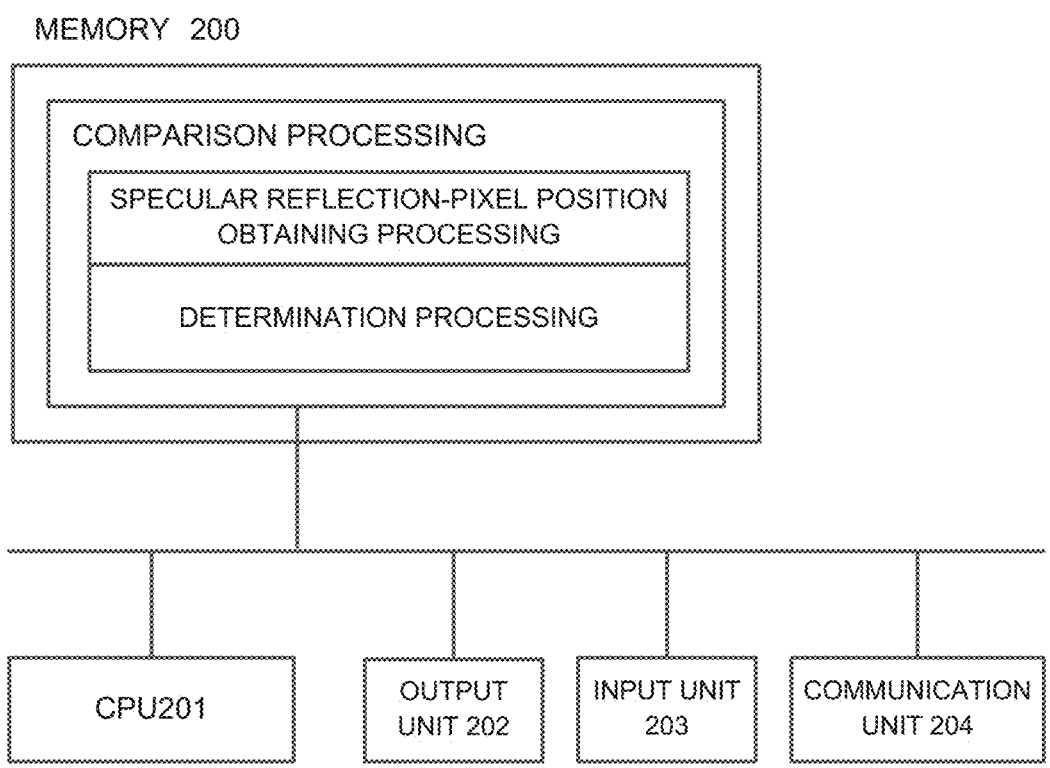
FIG. 10 illustrates an exemplary embodiment of a computer system run by a program.

More specifically, as illustrated in FIG. 10, the comparison system can be realized by a computer system that includes a memory 200, a CPU 201, an output unit 202, an input unit 203, and a communication unit 204. In this case, the memory 200 stores a program that executes processing corresponding to the processing performed by the above described comparison unit 20 (more specifically, specular reflection-pixel position obtaining processing corresponding to the processing performed by the specular reflection generating-pixel position obtaining unit 21 and determination processing corresponding to processing performed by the determination unit 22). The function of the comparison unit 20 is realized such that the CPU 201 executes a program stored in the memory 200 to refer to a registered image stored in an external registered image database. A received comparison image can be input via the input unit 203 or the communication unit 204. A comparison result can be output to the output unit 202 (e.g., display) or sent to an external terminal via the communication unit 204.

The whole or part of the exemplary embodiments disclosed above can be described as, but not limited to, the following supplementary notes.

(Supplementary Note 1)

A comparison system comprising a portable terminal including image capturing means configured to capture a comparison image of a predetermined comparison region of a comparison object, and a server including comparison means configured to compare the comparison object with a registered object on the basis of a statistical value for the luminance value of pixels in a registered image of the registered object, the pixels of the registered image existing at pixel positions corresponding to pixel positions estimated to be generating specular reflection in the comparison image captured by the portable terminal.

(Supplementary Note 2)

The comparison system according to supplementary note 1, wherein the comparison means comprises specular reflection-pixel position obtaining means configured to obtain positions of pixels estimated to be generating specular reflection from the comparison image of the predetermined comparison region of the comparison object, and a determination unit configured to obtain the luminance value of pixels in the registered image of the registered object, the pixels of the registered image existing at pixel positions corresponding to the obtained positions of pixels, calculate the statistical value of the obtained luminance value, and determine identicalness between the comparison object and the registered object.

(Supplementary Note 3)

The comparison system according to supplementary note 1 or 2, wherein the statistical value is a value indicating a degree of distribution of the luminance value of pixels, and wherein the determination unit determines that there is identicalness between the comparison object and the registered object if the statistical value is lower than a predetermined threshold.

(Supplementary Note 4)

The comparison system according to supplementary note 3, wherein the value indicating the degree of distribution of the luminance value of pixels is at least one of standard deviation or variance.

(Supplementary Note 5)

The comparison system according to supplementary note 3 or 4, wherein the predetermined threshold is calculated on the basis of a two-dimensional distribution including the luminance value of pixels estimated to be generating specular reflection in the registered image and the number of pixels estimated to be generating specular reflection in the registered image.

(Supplementary Note 6)

The comparison system according to any one of supplementary notes 2 to 5, wherein the specular reflection-pixel position obtaining means specifies pixels estimated to be generating specular reflections by utilizing at least one of a difference between an image to which light is applied from a light source and an image to which light is not applied, detecting pixels saturated with luminance in a comparison image, detecting color components, or detecting a peak of luminance in local area of image.

(Supplementary Note 7)

The comparison system according to any one of supplementary notes 1 to 5, wherein the server includes correction means configured to correct so that a position of a comparison region in the comparison image coincides with position of the registered image.

(Supplementary Note 8)

The comparison system according to any one of supplementary notes 1 to 7, wherein the predetermined comparison region includes a textured pattern or a random unevenness pattern applied to the comparison object.

(Supplementary Note 9)

The comparison system according to any one of supplementary notes 1 to 8, wherein the image capturing means applies light to the comparison object in such a way to cause a light source to position in a specific direction of the comparison object.

(Supplementary Note 10)

A comparison apparatus comprising comparison means configured to compare a comparison object with a registered object on the basis of a statistical value for the luminance value of pixels in a registered image of the registered object, the pixels of the registered image existing at pixel positions corresponding to pixel positions estimated to be generating specular reflection in a comparison image of a predetermined comparison region of the comparison object.

(Supplementary Note 11)

The comparison apparatus according to supplementary note 10, wherein the comparison means includes specular reflection-pixel position obtaining means configured to obtain positions of pixels estimated to be generating specular reflection from the comparison image of the predetermined comparison region of the comparison object, and a determination unit configured to obtain the luminance value of pixels in the registered image of the registered object, the pixels of the registered image existing at pixel positions corresponding to the obtained positions of pixels, calculate the statistical value of the obtained luminance value, and determine identicalness between the comparison object and the registered object.

(Supplementary Note 12)

A comparison method of comparing a comparison object with a registered object on the basis of a statistical value for the luminance value of pixels in a registered image of the registered object, the pixels of the registered image existing at pixel positions corresponding to pixel positions estimated to be generating specular reflection in a comparison image of a predetermined comparison region of the comparison object.

(Supplementary Note 13)

The comparison method according to supplementary note 12 comprising obtaining positions of pixels estimated to be generating specular reflection from the comparison image of the predetermined comparison region of the comparison object, obtaining the luminance value of pixels in the registered image of the registered object, the pixels of the registered image existing at pixel positions corresponding to the obtained positions of pixels, and determining identicalness between the comparison object and the registered object by calculating the statistical value for the obtained luminance value.

(Supplementary Note 14)

The comparison method according to supplementary note 12 or 13, wherein the statistical value is a value indicating a degree of distribution of the luminance value of pixels, and wherein the comparison method comprises determining that there is identicalness between the comparison object and the registered object if the statistical value is lower than a predetermined threshold.

(Supplementary Note 15)

The comparison method according to supplementary note 14, wherein the value indicating the degree of distribution of the luminance value of pixels is at least one of standard deviation or variance.

(Supplementary Note 16)

The comparison method according to supplementary note 14 or 15, wherein the predetermined threshold is calculated on the basis of a two-dimensional distribution including the luminance value of pixels estimated to be generating specular reflection in the registered image and the number of pixels estimated to be generating specular reflection in the registered image.

(Supplementary Note 17)

The comparison method according to any one of supplementary notes 12 to 16, wherein pixels estimated to be generating specular reflection are specified by utilizing at least one of a difference between an image to which light is applied from a light source and an image to which light is not applied, detecting pixels saturated with luminance in a comparison image, detecting color components, or detecting a peak of luminance in local area of image.

(Supplementary Note 18)

The comparison method according to any one of supplementary notes 12 to 17, wherein a position of the comparison region in the comparison image is corrected in such a manner that the position coincides with that in the registered image.

(Supplementary Note 19)

A program causing a computer to execute comparison processing, wherein the processing comprises comparing a comparison object with a registered object on the basis of a statistical value for the luminance value of pixels in a registered image of the registered object, the pixels of the registered image existing at pixel positions corresponding to pixel positions estimated to be generating specular reflection in a comparison image of a predetermined comparison region of the comparison object.

(Supplementary Note 20)

The program according to supplementary note 19, wherein the comparison processing comprises obtaining positions of pixels estimated to be generating specular reflection from the comparison image of the predetermined comparison region of the comparison object, obtaining the luminance value of pixels in the registered image of the registered object, the pixels of the registered image existing at pixel positions corresponding to the obtained positions of pixels, and determining identicalness between the comparison object and the registered object by calculating the statistical value for the obtained luminance value.

(Supplementary Note 21)

A comparison apparatus comprising a memory, and a processor, wherein the processor has a comparison function of comparing a comparison object with a registered object on the basis of a statistical value for the luminance value of pixels in a registered image of the registered object, the pixels of the registered image existing at pixel positions corresponding to pixel positions estimated to be generating specular reflection in a comparison image of a predetermined comparison region of the comparison object.

(Supplementary Note 22)

The comparison apparatus according to supplementary note 21, wherein the processor has a specular reflection-pixel position obtaining function of obtaining positions of pixels estimated to be generating specular reflection from the comparison image of the predetermined comparison region of the comparison object, and a determination function of obtaining the luminance value of pixels in the registered image of the registered object, the pixels of the registered image existing at pixel positions corresponding to the obtained positions of pixels, calculating the statistical value for the obtained luminance value, and determining identicalness between the comparison object and the registered object.

(Supplementary Note 23)

The comparison apparatus according to supplementary note 21 or 22, wherein the statistical value is a value indicating a degree of distribution of the luminance value of pixels, and wherein the determination unit determines that there is identicalness between the comparison object and the registered object if the statistical value is lower than a predetermined threshold.

(Supplementary Note 24)

The comparison apparatus according to supplementary note 23, wherein the value indicating the degree of distribution of the luminance value of pixels is at least one of standard deviation or variance.

(Supplementary Note 25)

The comparison apparatus according to supplementary note 23 or 24, wherein the predetermined threshold is calculated on the basis of a two-dimensional distribution including the luminance value of pixels estimated to be generating specular reflection in the registered image and the number of pixels estimated to be generating specular reflection in the registered image.

(Supplementary Note 26)

The comparison apparatus according to any one of supplementary notes 22 to 25, wherein the specular reflection-pixel position obtaining function specifies pixels estimated to be generating specular reflection by utilizing at least one of a difference between an image to which light is applied from a light source and an image to which light is not applied, detecting pixels saturated with luminance in the comparison image, detecting color components, or detecting a peak of luminance in local area of image.

(Supplementary Note 27)

The comparison apparatus according to any one of supplementary notes 21 to 26, wherein the processor has a correction function of correcting a position of the comparison region in the comparison image such that the position coincides with that in the registered image.

(Supplementary Note 28)

The comparison apparatus according to any one of supplementary notes 21 to 27, wherein the predetermined comparison region includes a textured pattern or a random unevenness pattern applied to the comparison object.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application claims the benefit of Japanese Patent Application No. 2015-38682, filed Feb. 27, 2015, the disclosure of which is hereby incorporated by reference.

REFERENCE CHARACTER LIST 1 portable terminal
2 server
11 image capturing unit
20 comparison unit
21 specular reflection generating-pixel position obtaining unit
22 determination unit
30 comparison apparatus
101 image capturing unit
102 histogram computing unit
103 registered image database
104 image capturing unit
105 comparison image position correction unit
106 specular reflection generating-pixel position obtaining unit
107 determination unit
200 memory
201 CPU
202 output unit
203 input unit
204 communication unit

The invention claimed is:

1. A comparison system comprising:
a portable terminal including a first processor configured to control an image capturing element and to obtain a comparison image of a predetermined comparison region of a comparison object, the object being any of televisions, personal computers, smartphones, bags, parts including fastening parts, screws, nails, gears, bearings, pipes, valves, shafts, semiconductor chips, commodity tags, parts made of plastic, ceramics and manufacturing product; and
a server including a second processor programmed to compare the comparison object with a registered object on the basis of a statistical value for a luminance value of pixels in a registered image of the registered object, the pixels of the registered image existing at pixel positions corresponding to pixel positions estimated to be generating specular reflection in the comparison image captured by the portable terminal, and determine whether the comparison object and the registered object are identical by using the result of comparing.

2. The comparison system according to claim 1, wherein the second processor further programmed to:
obtain positions of pixels estimated to be generating specular reflection from the comparison image of the predetermined comparison region of the comparison object; and
obtain the luminance value of pixels in the registered image of the registered object, the pixels of the registered image existing at pixel positions corresponding to the obtained positions of pixels, calculate the statistical value of the obtained luminance value, and determine identicalness between the comparison object and the registered object.

3. The comparison system according to claim 1:
wherein the statistical value is a value indicating a degree of distribution of the luminance value of pixels; and
wherein the second processor further programmed to determine that there is identicalness between the comparison object and the registered object if the statistical value is lower than a predetermined threshold.

4. The comparison system according to claim 3, wherein the value indicating the degree of distribution of the luminance value of pixels is at least one of standard deviation or variance.

5. The comparison system according to claim 3, wherein the predetermined threshold is calculated on the basis of a two-dimensional distribution including the luminance value of pixels estimated to be generating specular reflection in the registered image and the number of pixels estimated to be generating specular reflection in the registered image.

6. The comparison system according to claim 2, wherein the second processor further programmed to specify pixels estimated to be generating specular reflections by utilizing at least one of a difference between an image to which light is applied from a light source and an image to which light is not applied, detecting pixels saturated with luminance in the comparison image, detecting color components, or detecting a peak of luminance in local area of image.

7. The comparison system according to claim 1, wherein the second processor further programmed to correct so that a position of the comparison region in the comparison image coincides with position of the registered image.

8. The comparison system according to claim 1, wherein the predetermined comparison region comprises a textured pattern or a random unevenness pattern applied to the comparison object.

9. The comparison system according to claim 1, wherein the first processor applies light to the comparison object in such a way to cause a light source to position in a specific direction of the comparison object.

10. A comparison apparatus comprising:
a processor programmed to:
receive an registered image of a registered object, the object being any of televisions, personal computers, smartphones, bags, parts including fastening parts, screws, nails, gears, bearings, pipes, valves, shafts, semiconductor chips, commodity tags, parts made of plastic, ceramics and manufacturing product;
receive an image of a comparison object;
compare the comparison object with the registered object on the basis of a statistical value for a luminance value of pixels in the registered image of the registered object, the pixels of the registered image existing at pixel positions corresponding to pixel positions estimated to be generating specular reflection in a comparison image of a predetermined comparison region of the comparison object; and determine whether the comparison object and the registered object are identical by using the result of comparing.

11. The comparison apparatus according to claim 10, wherein the processor further programmed to:

obtain positions of pixels estimated to be generating specular reflection from the comparison image of the predetermined comparison region of the comparison object; and determine the luminance value of pixels in the registered image of the registered object, the pixels of the registered image existing at pixel positions corresponding to the obtained positions of pixels, calculate the statistical value of the obtained luminance value, and determine identicalness between the comparison object and the registered object.

12. A comparison method comprising executing on a processor:

receiving an registered image of a registered object, the object being any of televisions, personal computers, smartphones, bags, parts including fastening parts, screws, nails, gears, bearings, pipes, valves, shafts, semiconductor chips, commodity tags, parts made of plastic, ceramics and manufacturing product;

receiving an image of a comparison object;

comparing the comparison object with the registered object on the basis of a statistical value for a luminance value of pixels in the registered image of the registered object, the pixels of the registered image existing at pixel positions corresponding to pixel positions estimated to be generating specular reflection in a comparison image of a predetermined comparison region of the comparison object; and determining whether the comparison object and the registered object are identical by using the result of comparing.

13. The comparison method according to claim 12 comprising:

obtaining positions of pixels estimated to be generating specular reflection from the comparison image of the predetermined comparison region of the comparison object;

obtaining the luminance value of pixels in the registered image of the registered object, the pixels of the registered image existing at pixel positions corresponding to the obtained positions of pixels; and determining identicalness between the comparison object and the registered object by calculating the statistical value for the obtained luminance value.

14. The comparison method according to claim 12:

wherein the statistical value is a value indicating a degree of distribution of the luminance value of pixels; and wherein the comparison method comprises determining that there is identicalness between the comparison object and the registered object if the statistical value is lower than a predetermined threshold.

15. The comparison method according to claim 14, wherein the value indicating the degree of distribution of the luminance value of pixels is at least one of standard deviation or variance.

16. The comparison method according to claim 14, wherein the predetermined threshold is calculated on the basis of a two-dimensional distribution including the luminance value of pixels estimated to be generating specular reflection in the registered image and the number of pixels estimated to be generating specular reflection in the registered image.

17. The comparison method according to claim 12, wherein a position of the comparison region in the comparison image is corrected in such a manner that the position coincides with that in the registered image.

18. A non-transitory computer readable storage medium storing a program causing a computer to execute comparison processing, wherein the processing comprises:

receiving an registered image of a registered object, the object being any of televisions, personal computers, smartphones, bags, parts including fastening parts, screws, nails, gears, bearings, pipes, valves, shafts, semiconductor chips, commodity tags, parts made of plastic, ceramics and manufacturing product;

receiving an image of a comparison object;

comparing the comparison object with the registered object on the basis of a statistical value for a luminance value of pixels in the registered image of the registered object, the pixels of the registered image existing at pixel positions corresponding to pixel positions estimated to be generating specular reflection in a comparison image of a predetermined comparison region of the comparison object; and determining whether the comparison object and the registered object are identical by using the result of comparing.

19. The non-transitory computer readable storage medium storing a program according to claim 18, wherein the comparison processing comprises obtaining positions of pixels estimated to be generating specular reflection from the comparison image of the predetermined comparison region of the comparison object;

obtaining the luminance value of pixels in the registered image of the registered object, the pixels of the registered image existing at pixel positions corresponding to the obtained positions of pixels, and determining identicalness between the comparison object and the registered object by calculating the statistical value for the obtained luminance value.

20. The comparison method according to claim 12 comprising:

registering the image and information associated with the registered object, the information including a place of manufacturing, a kind of product, a product date, a destination date, and a delivery date; and outputting the information associated with the registered object by associated as the result of determining.

* * * * *